United States Patent Office 3,215,737
Patented Nov. 2, 1965

3,215,737
PREPARATION OF 2-AMINO-5-NITRO-BENZO-
PHENONE AND DERIVATIVES THEREOF
Aaron L. Nelson, Mountainside, and Albert Israel Rachlin, Hackensack, N.J., assignors to Hoffmann-La Roche Inc., Nutley, N.J., a corporation of New Jersey
No Drawing. Filed May 24, 1963, Ser. No. 282,886
3 Claims. (Cl. 260—570)

The present invention relates to novel processes for the preparation of therapeutically valuable compounds and to novel processes for the preparation of valuable intermediates for valuable therapeutic compounds. More particularly, the present invention relates to the preparation of valuable therapeutic compounds of the formula:

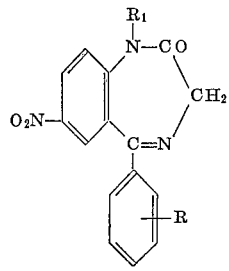

I wherein R is selected from the group consisting of hydrogen and halogen and $R_1$ is selected from the group consisting of hydrogen and lower alkyl.

The compounds of Formula I, in addition to being valuable therapeutics, useful as muscle relaxants and anticonvulsants, are also useful as intermediates for the preparation of other valuable therapeutics.

The term "lower alkyl" as used herein comprehends both straight and branched chain hydrocarbon groups such as methyl, ethyl, propyl, isopropyl, and the like. The term "halogen" as used herein comprehends all four halogens, i.e. chlorine, fluorine, bromine, and iodine.

One known method of preparing compounds of Formula I, is by nitration of compounds of the formula:

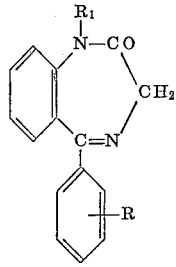

II wherein $R_1$ and R have the same meaning as above.

A second known method for preparing compounds of Formula I involves the reaction of a compound of the formula:

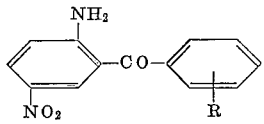

III wherein R has the same meaning as above with a haloacetyl halide to form a 2-haloacetylaminobenzophenone, which is then reacted with ammonia to yield a compound which is then cyclized to yield a compound of Formula II wherein $R_1$ is hydrogen, which compound if desired, can then be alkylated. The compounds of Formula III, used as starting material in the second synthesis, have been prepared via nitration of corresponding aminobenzophenones.

It will be seen from the above that the known syntheses of compounds of Formula II depend upon an aromatic nitration step. Such a nitration is not position specific but results in a mixture of products bearing nitro groups in differing aromatic positions. To obtain a pharmaceutical grade product, such mixtures must be separated and the desired product purified. On any scale this is a cumbersome and difficult procedure, but on a commercial scale it is especially burdensome.

The object of the instant information is to provide a synthesis of compounds of Formula III which is position specific.

The present invention, in one aspect, constitutes a process which comprises reacting para-nitroaniline with a compound selected from the group consisting of benzoyl halide and halobenzoyl halide in the presence of zinc chloride, and converting the so-formed compound of the formula

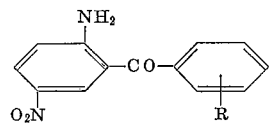

wherein R is selected from the group consisting of hydrogen and halogen, into a compound of the formula

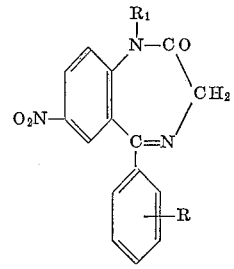

wherein $R_1$ is selected from the group consisting of hydrogen and lower alkyl and R has the same meaning as above.

A further embodiment of the present invention comprises a method for the preparation of compounds of the formula

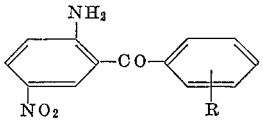

wherein R is selected from the group consisting of hydrogen and halogen,
which comprises reacting para-nitroaniline with a compound selected from the group consisting of benzoyl halide and halo-benzoyl halide in the presence of zinc chloride.

In short, the key feature of the instant invention is the discovery that it is possible to obtain a 2-amino-5-nitrobenzophenone by the acylation of para-nitroaniline with a benzoyl halide. This surprising discovery avoids isomeric contaminants introduced by the aromatic nitrations necessitated by the previously known syntheses.

The reaction of the benzoyl halide (a benzoyl chloride is preferred) with para-nitroaniline in the presence of zinc chloride is suitably effected at an elevated temperature. It is especially preferable to conduct the reaction at a temperature of above about 130° C. inasmuch as solidification of the reaction mass is likely to occur at lower temperatures. The reaction should be conducted in an anhydrous medium, and can be conducted in the absence of any solvent outside of the reactants themselves, or can be conducted in the presence of an indifferent solvent. Suitably, the reactants are used in about equal molar amounts, but they can be used in any molar ratio and such is not critical to the success of the reaction.

The following examples illustrate the invention, but are not limitative thereof. Variations in procedure will be readily apparent to those skilled in the art and are within the scope of the present invention. All temperatures are stated in degrees centigrade.

*Example 1*

4.351 kg. of ortho-chlorobenzoyl chloride and 2.087 kg. of anhydrous zinc chloride are placed into a 22 liter, 3-neck flask equipped with a sealed stirrer, thermometer, reflux condenser and gas scrubber. With the internal temperature maintained at 130–140°, 1.657 kg. of para-nitroaniline was added in small portions over a period of about 30 minutes. The temperature was then raised to 200–205° and maintained at this range for 1 hour at which point dilute acetic acid (prepared from 2.975 liters of water and 4.25 liters of glacial acetic acid) was added cautiously over a period of about 45 minutes, during which period a temperature drop was observed. 5.525 liters of concentrated sulfuric acid was added to the reaction mixture which warmed up to the reflux temperature, at which point considerable hydrogen chloride was evolved (such frothing as was encountered was controlled with a silicone defoaming agent, Dow-Corning antifoam A.). Refluxing was maintained for 4 hours and the mixture was permitted to cool overnight at room temperature. The solid mass was then reheated to 60°, and 14 liters of hot water (approximately 60°) and 15 liters of hot toluene (approximately 60°) were added in portions while the reaction mixture was transferred to a separator wherein the temperature of the reaction mixture was maintained at 60°. The aqueous layer was then separated and the hot toluene layer washed with 6 liters of warm (approximately 60°) 3 N hydrochloric acid in three equal parts, following which 6 liters of hot water (at least 60°) was added to the toluene layer. Then, with vigorous stirring, 50 percent caustic soda was added until pH 11 was reached. The resulting emulsion was filtered through a pad of filter aid (Hyflo). The clear phases of the filtrate were then separated and the hot toluene layer washed with 8 liters of hot water (at least 60°) in four equal parts. The resulting solution was distilled on a steambath under reduced pressure (water pump) to a volume of about 1 liter, cooled slowly to below room temperature, filtered, washed with 200 cc. of cold toluene (5–10°) in 2 equal portions and dried in vacuo at 60–80°, yielding 2-amino-5-nitro-2′-chlorobenzophenone melting at 118–120°.

*Example 2*

3.942 kg. of o-fluorobenzoyl chloride, 2.087 kg. of anhydrous zinc chloride and 1.657 kg. of para-nitroaniline were reacted according to the procedure described in Example 1 above, yielding 2-amino-5-nitro-2′-fluorobenzophenone melting at 161–163°.

*Example 3*

3.495 kg. of benzoyl chloride and 2.087 kg. of anhydrous zinc chloride were placed in a 22 liter, 3-neck flask equipped with a sealed stirrer, thermometer, reflux condenser and a scrubber. While stirring, the reaction mixture was heated to 140° with the internal temperature maintained at 140°, 1.657 kg. of para-nitroaniline were added in small increments over a period of about 30 minutes. When all the para-nitroaniline had been added, the temperature was raised to 200–205° and held at this point for one hour. A mixture of 1.740 liters of tap water and 2.785 kg. of 36 percent hydrochloric acid was then added to the reaction mixture. When the addition was completed, a second reflux condenser was attached to the flask and the reaction mixture stirred under reflux for 15 hours. At this point, the reaction mixture was permitted to cool to 100–105° and a mixture of 613 ml. of 26 percent ammonium hydroxide and 4.2 liters of tap water was added. The reaction mixture was then extracted with 6.5 liters of toluene (at about 50–60°) and the aqueous phase separated and extracted once again with 2.0 liters of fresh toluene (at about 50–60°). The separate toluene extracts were washed with 6.0 liters of warm (at about 50–60°) 3 N hydrochloric acid in three equal parts. 2.0 liters of hot water (at about 50–60°) was then added to the toluene extracts and the resulting mixture sirred vigorously while causic soda—50 percent was added slowly until pH 11 was attained. The alkaline aqueous phase was separated and the toluene extract then washed with 2.0 liters of hot water (at about 50–60°) in two equal parts. The toluene extract was then azeotropically dried (steam bath) by concentration under reduced pressure to a volume of about one liter. The reaction mixture was then permitted to cool to room temperature whereupon the product crystallized out in the form of shinning, brown crystals. These crystals were filtered off, washed with a small amount of cold toluene (5–10°) and vacuum dried at 100° yielding 2-amino-5-nitrobenzophenone melting at 158–159°.

We claim:

1. A method for the preparation of compounds of the formula

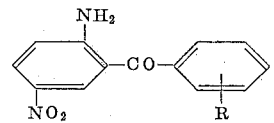

wherein R is selected from the group consisting of hydrogen and halogen, which comprises reacting para-nitroaniline with a compound selected from the group consisting of benzoyl halide and halobenzoyl halide in the presence of zinc chloride.

2. A process for the preparation of 2-amino-2′-halo-5-nitrobenzophenone which comprises reacting ortho-halobenzoyl halide with para-nitroaniline in the presence of zinc chloride.

3. A process for the preparation of 2-amino-5-nitrobenzophenone which comprises reacting benzoyl halide with para-nitroaniline in the presence of zinc chloride.

References Cited by the Examiner

UNITED STATES PATENTS

| 3,109,843 | 11/63 | Reeder et al. | 260—239 |
| 3,121,114 | 2/64 | Keller et al. | 260—239 |

OTHER REFERENCES

Sternbach et al.: J. Org. Chem. vol. 26, pages 4488–4497 (1961).

NICHOLAS S. RIZZO, *Primary Examiner.*